United States Patent [19]
Jarvis

[11] Patent Number: 6,038,705
[45] Date of Patent: *Mar. 21, 2000

[54] IMPACT RESISTANT FACE SHIELD

[75] Inventor: Edward C. Jarvis, Boxford, Mass.

[73] Assignee: Oakley, Inc., Foothill Ranch, Calif.

[*] Notice: This patent is subject to a terminal disclaimer.

[21] Appl. No.: 09/167,056

[22] Filed: Oct. 6, 1998

[51] Int. Cl.[7] ................................................ A42B 3/20
[52] U.S. Cl. ........................... 2/424; 2/9; 2/425; 351/175
[58] Field of Search ............................. 2/9, 10, 424, 425, 2/427, 428, 430; 351/170, 175, 41

[56] References Cited

U.S. PATENT DOCUMENTS

| | | |
|---|---|---|
| D. 365,591 | 12/1995 | Jannard et al. . |
| D. 369,375 | 4/1996 | Jannard et al. . |
| 1,332,410 | 3/1920 | Potts . |
| 1,354,040 | 9/1920 | Hammon . |
| 1,536,828 | 5/1925 | Drescher . |
| 1,619,341 | 3/1927 | Gagnon . |
| 1,697,030 | 1/1929 | Tillyer . |
| 1,741,536 | 12/1929 | Rayton . |
| 1,910,466 | 5/1933 | Glancy . |
| 1,942,400 | 1/1934 | Glancy . |
| 2,406,608 | 8/1946 | Joyce . |
| 2,442,849 | 6/1948 | Glazer . |
| 2,860,343 | 11/1958 | Aileo . |
| 3,055,256 | 9/1962 | Andressen, Jr. . |
| 3,149,632 | 9/1964 | Colley . |
| 3,162,862 | 12/1964 | Miller . |
| 3,223,086 | 12/1965 | Denson . |
| 3,229,303 | 1/1966 | Jonassen . |
| 3,423,758 | 1/1969 | Heacox . |
| 3,586,448 | 6/1971 | Beasse . |
| 3,594,816 | 7/1971 | Webb et al. . |
| 3,806,951 | 4/1974 | Halteman . |
| 3,897,597 | 8/1975 | Kasper . |
| 4,271,537 | 6/1981 | Bowlus et al. . |
| 4,271,538 | 6/1981 | Montesi et al. . |
| 4,315,335 | 2/1982 | Kennedy, Jr. et al. . |
| 4,443,893 | 4/1984 | Yamamoto . |
| 4,446,576 | 5/1984 | Hisataka . |
| 4,498,202 | 2/1985 | Yamamoto . |
| 4,515,448 | 5/1985 | Tackles . |
| 4,613,217 | 9/1986 | Fuerter et al. . |
| 4,737,918 | 4/1988 | Langlois et al. . |
| 4,761,315 | 8/1988 | Logan et al. . |
| 4,859,048 | 8/1989 | Jannard . |
| 4,867,550 | 9/1989 | Jannard . |
| 5,050,979 | 9/1991 | Shinohara . |
| 5,056,156 | 10/1991 | Kosmo et al. . |
| 5,131,101 | 7/1992 | Chin . |
| 5,206,955 | 5/1993 | Milligan ................................. 2/424 X |

(List continued on next page.)

FOREIGN PATENT DOCUMENTS

| | | |
|---|---|---|
| 0 456 321 | 5/1949 | Canada . |
| 015796 | 9/1980 | European Pat. Off. . |
| 0 121 018 A2 | 10/1984 | European Pat. Off. . |
| 0 269 259 A1 | 10/1987 | European Pat. Off. . |
| 2 626 086 | 7/1989 | France . |
| 2 626 683 | 8/1989 | France . |
| 2 688 322 | 9/1993 | France . |
| 2 740 231 | 4/1997 | France . |
| 37 17 850 A1 | 7/1989 | Germany . |
| 1 765 802-A1 | 9/1992 | Switzerland . |
| 681314 | 10/1952 | United Kingdom . |
| 2 014 036 | 1/1979 | United Kingdom . |
| 2 278 459 | 11/1994 | United Kingdom . |

*Primary Examiner*—Peter Nerbun
*Attorney, Agent, or Firm*—Knobbe, Martens, Olson & Bear, LLP

[57] ABSTRACT

An impact resistant face shield that includes a single formed arcuate lens portion that, in a first orientation, has a first curvature extending in a horizontal direction and a second curvature extending in a vertical direction. The lens portion has a top portion and a bottom portion that extends relatively inwardly towards the face of the wearer relative to an intermediate portion disposed between the top and bottom portions. Each curvature of the lens defines an arc of a circle having a substantially uniform radius to produce nominal levels of distortion, thereby reducing the prism effects created by the lens, and providing an optically corrected viewing window.

15 Claims, 8 Drawing Sheets

U.S. PATENT DOCUMENTS

| | | |
|---|---|---|
| 5,208,614 | 5/1993 | Jannard . |
| 5,347,323 | 9/1994 | Wilson . |
| 5,390,369 | 2/1995 | Tubin . |
| 5,541,674 | 7/1996 | Jannard . |
| 5,555,038 | 9/1996 | Conway . |
| 5,648,832 | 7/1997 | Houston et al. . |
| 5,689,323 | 11/1997 | Houston et al. . |
| 5,805,261 | 9/1998 | Houston et al. . |
| 5,815,848 | 10/1998 | Jarvis ......... 2/424 |

$R_1 - R_2 \approx d_\Theta$ $|C_1 - C_2| < d_\Theta$ $t < d_\Theta$

IMPACT RESISTANT FACE SHIELD

BACKGROUND OF THE INVENTION

This invention relates to mechanical protective devices, and more particularly to impact resistant face shields for use in protecting the face of an individual.

Today, sports are more popular than ever. This increase in popularity has resulted in an increase in the number of amateur and professional sport participants. Unfortunately, increased participation has resulted in an increase in the number of injuries suffered by individuals, and particularly in the number of facial injuries. Consequently, some sports now recommend and/or require the use of face shields or other facial protective devices when participating in the sport. One such sport is hockey.

Conventional face shields suitable for use in sports, such as those manufactured by Itech Sports Products, Inc. under the trade designation ITECH® Type IV sports protector, typically consist of a transparent polycarbonate blank that is formed or molded into a convex shield, which is adapted for mounting to existing sport helmets. The shield, when mounted to the helmet, extends generally outwardly and away from the wearer's face. As a result of this mounting configuration, objects located in the external environment appear at least partially distorted. Thus, the molded polycarbonate blank introduces some distortion over a portion of the individual's field of view.

The distorting effects of conventional face shields creates a unique set of problems for the wearer. The shield can cause strain on the wearer's eyes, which over a period of time can have deleterious effects. Additionally, rapidly viewing objects through the face shield and conversely not through the face shield produces further eye strain by requiring the individual to focus differently for each different field of view.

Due to the foregoing and other shortcomings of existing face shields, an object of this invention is to provide a face shield that reduces optical distortion.

Another object of this invention is to provide a protective face shield that has relatively high optical clarity and resolution.

Still another object of the invention is to provide a face shield that reduces the eye strain.

Yet another object of the invention is to provide a face shield that is relatively strong and durable and relatively lightweight.

Other general and more specific objects of the invention will in part be obvious and will in part appear from the drawings and description which follow.

SUMMARY OF THE INVENTION

The present invention relates to protective face shields that provide for higher image resolution and contrast during use. The improved contrast and resolution is achieved by providing an impact resistant face shield that addresses optical and mechanical concerns. Specifically, the present invention provides for an optically-correct face shield.

The invention attains an optically correct face shield by structuring the face shield to have an inner radius, an outer radius, a thickness and a refractive index, where the foregoing are mated to provide for a shield that lies between a truly plano lens and a lens having concentric geometry, e.g., constant thickness. The optical qualities of the lens are such that the prism and dioptric power are relatively low, and preferably between about 0.01 diopter and about 0.10 diopter.

The face shield preferably includes a single formed arcuate lens portion that, in a first orientation, has a first curvature extending in a horizontal direction and a second curvature extending in a vertical direction. The lens portion has a top portion and a bottom portion that extends relatively inwardly towards the face of the wearer relative to an intermediate portion disposed between the top and bottom portions. Each curvature of the lens defines an arc of a circle having a substantially uniform radius to produce nominal levels of distortion, thereby reducing the prism effects, e.g., non-uniform distortions of the field, created by the lens, and providing an optically corrected viewing window.

According to one aspect, the lens portion of the face shield of the present invention has a thickness defined between outer and inner surfaces. The surfaces preferably have different radii of curvatures about centers that are shifted relative to each other. This eccentricity shifts one surface with respect to the other, to create a curved lens that has a thickness d that varies along the arc length of the face shield. The diametral lines of the surfaces are shifted such that the inner surface is moved back from a concentric position, thickening the central portion of the lens, and creating edges that are thinner relative to the central thickened region. This variable thickness, and particularly the thinning effect of the lens at the edges, optically corrects the lens at the peripheral regions by reducing the occurrence of prismatic deviations and overall prism imbalance.

According to another aspect of the invention, the shield preferably includes a frame structure that is formed about at least a portion of the lens. According to one embodiment, the frame includes ventilation apertures formed in a top portion of the face shield. The ventilation apertures allow air to flow through the mask to provide for proper ventilation of the shield to resist or remove fogging.

According to another practice of the invention, the face shield surrounds a substantial portion of the wearer's face when situated properly thereabout. In this position, the inside surface of the lens is substantially non-oblique relative to the wearer's face and the wearer's field of view is substantially normal to the inside surface of the lens about most of the field of view. Additionally, the face shield extends in the vertical direction a distance sufficient to include a substantial portion of the downward field of view without imposing upon the wearer the distortions and aberrations created by the edges of the shield.

The present invention further pertains to a face protective shield having a shield body formed of strong clear polymeric material having a peripheral region and a central region. The peripheral region includes an attachment element for securing the shield bode in front of the wearer's face. The central region is preferably formed as a viewing window sized to extend around in front of the wearer's face. According to one aspect, the shield has a thickness effective to survive impact without cracking and curves in both horizontal and vertical planes over substantially the entire central region to introduce a degree of lensing and correct viewing aberrations.

According to another aspect, the central region has front and rear surfaces. The front surface has a radius of curvature $R_f$ greater than the rear surface radius of curvature $R_r$, such that $R_f - R_r = \delta$. According to still another aspect, the centers of curvature of the front and rear surfaces are spaced closer than $\delta$.

According to another aspect, the lensing power of the shield is negative in at least the horizontal plane.

Other general and more specific objects of the invention will in part be obvious and will in part be evident from the drawings and description which follow.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale, show relative dimensions.

DESCRIPTION OF ILLUSTRATED EMBODIMENTS

FIGS. 1–4 illustrate the general principles of the protective face shield of the present invention. These general principles pertain to each of the additional face shield embodiments set forth and described below.

Figure 1:
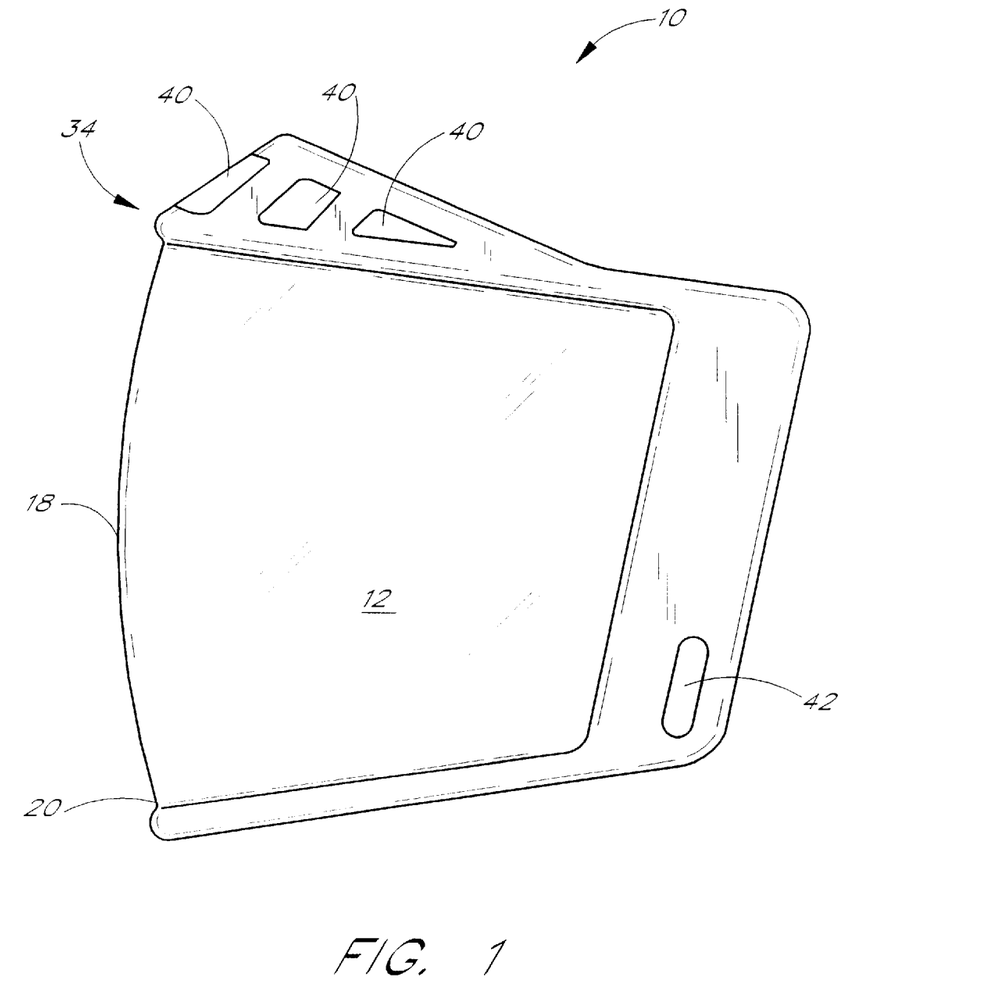
FIG. 1 is a side view of a first embodiment of the face shield of the present invention.
Figure 2:
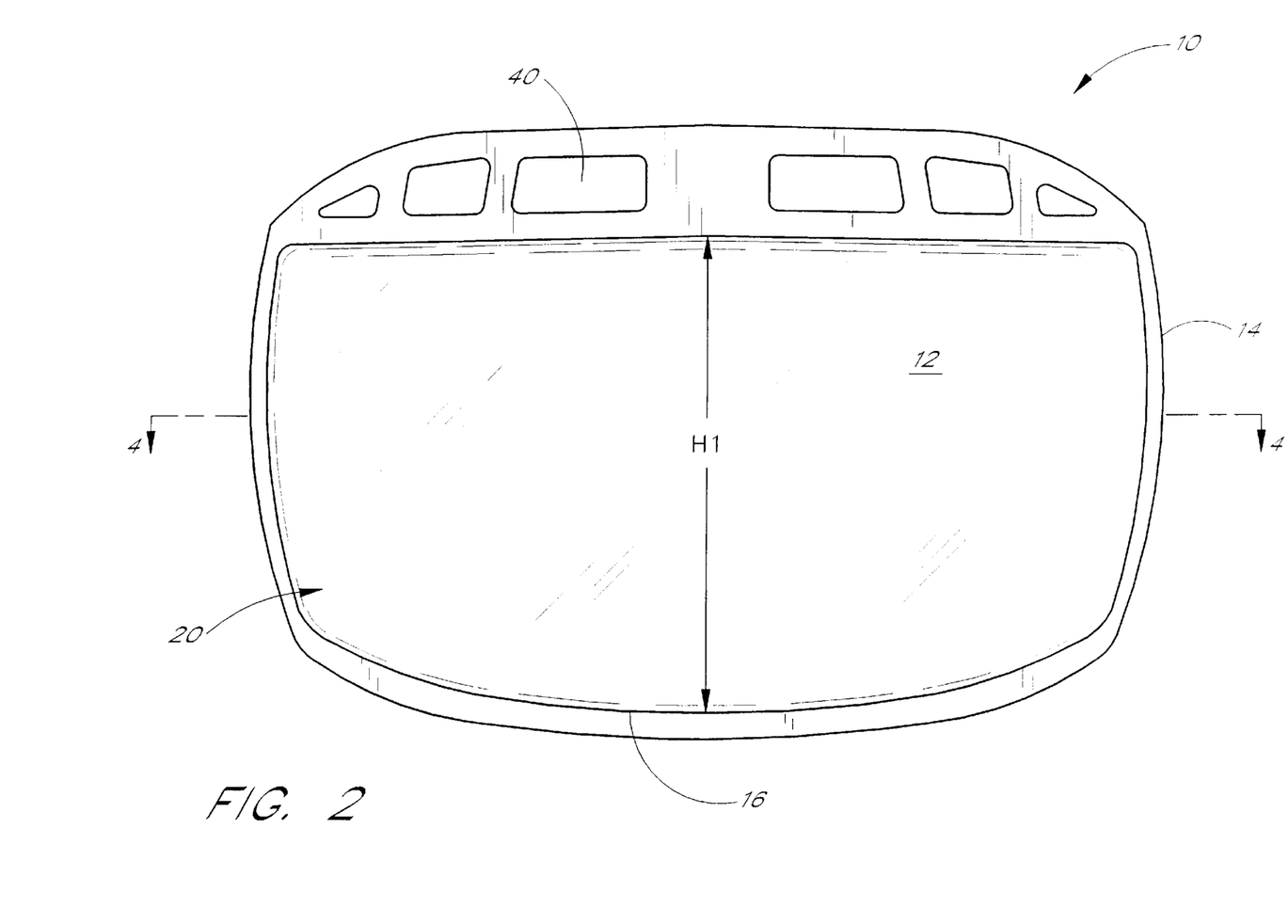
FIG. 2 is a front view of the face shield of FIG. 1.

FIGS. 1 and 2 illustrate a first embodiment of the face shield 10 of the present invention. The face shield 10 includes a unitary curved lens portion 12 that is encompassed by a beaded frame structure 14 disposed about a substantial portion of the periphery of the lens. Preferably, the beaded frame 14 is integrally molded with the lens portion 12.

The lens portion 12 has a first or horizontal curvature 16 (as seen in a horizontal plane), and a second vertical curvature 18. The horizontal curvature 16 has a circular cross-section and approximates a complete semi-circle, e.g., subtends an arc of about 180°, and thus provides a wraparound face shield that covers and protects the face of the wearer while providing a window portion that extends about a substantial portion of the wearer's potential field of view. The potential field of view is substantially greater than the actual view of any moment, and includes the extremes at each side that become visible as the wearer rotates his eyes, but without re-orienting his head. The vertical curvature 18 has a circular cross-section, and a bottom portion 20 that extends relatively inwardly towards the face of the wearer relative to an intermediate portion 22 of the lens 12. The wrap-around configuration of the lens 12 in both the horizontal and vertical directions provides a single view pane through which the wearer observes the external environment. This configuration allows the wearer to observe objects at any location through the lens portion 12 without requiring the wearer to change viewing environments, for example, view one object through the lens and another object at a different location outside of the view frame of the lens. A significant advantage of this is that it reduces eye strain by allowing the wearer to view the environment through a single wrap-around window.

Figure 3:
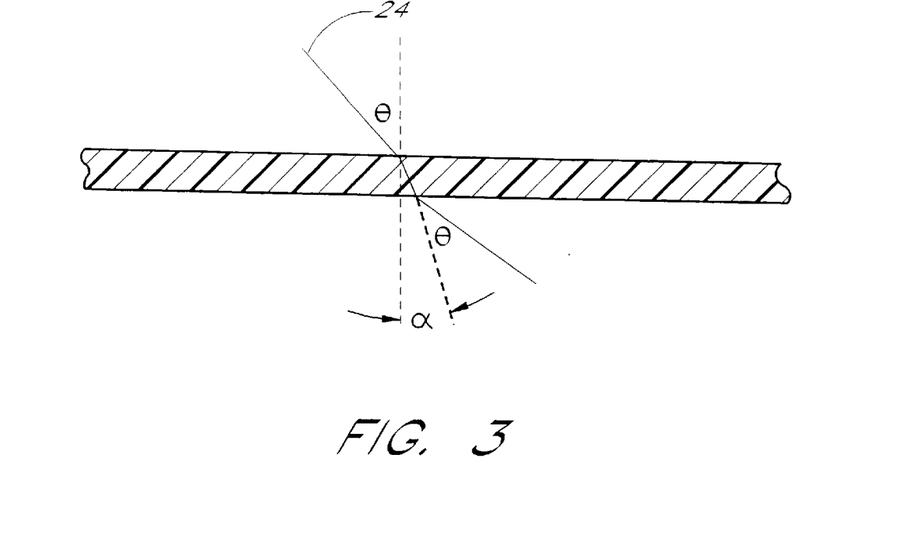
FIG. 3 is a schematic representation of light rays impinging upon a conventional plano lens.

It is known that light rays striking a plano lens of known construction at a selected angle θ emerge from the lens at the angle θ but offset by a selected displacement α determinable by known formulae, as shown in FIG. 3. For example, a light ray 24 that impinges upon the lens is offset the distance α, which is dependent upon the lens thickness, the angle of incidence and the refractive index of the lens material. The light ray 24 exits the lens at the angle of incidence θ. These variations in the refraction of light introduce distortions into the field of view, particularly when viewing objects along a sight line that intersects the window obliquely. Thus, an object located at or near the periphery of the field of view may appear elongated and/or shifted in space relative to the actual spatial location of the object. This phenomena represents a common problem with conventional impact resistant face shields. Since the shields must be sufficiently thick to attain strength, they necessarily introduce distortion effects.

Referring again to FIGS. 1 and 2, each curvature 16 and 18 of the lens portion 12 defines an arc of a circle having a substantially uniform radius. This dual-curvature configuration provides a viewing window that is oriented almost normal to the line of sight as the wearer's eyes rotate to view objects. It produces only nominal levels of distortion, reducing the prism effects, e.g., non-uniform distortions of the field, created by the lens portion 12, and provides an optically corrected viewing window. Although a variety of radii might accrue the advantages of the present invention, the radius of the horizontal curvature 16 is preferably in the range between about 3 inches and about 5 inches, and most preferably is about 4 inches. The radius of the vertical curvature is preferably in the range between about 6.5 inches and about 8.5 inches, and most preferably is about 7.4 inches. The foregoing radius dimensions represent the distance from arbitrary center of curvature points to the arc defined by each curvature of the illustrated face shield 10. This construction defines a uniform distance to allow a full and unobstructed viewing hemisphere.

Figure 4:
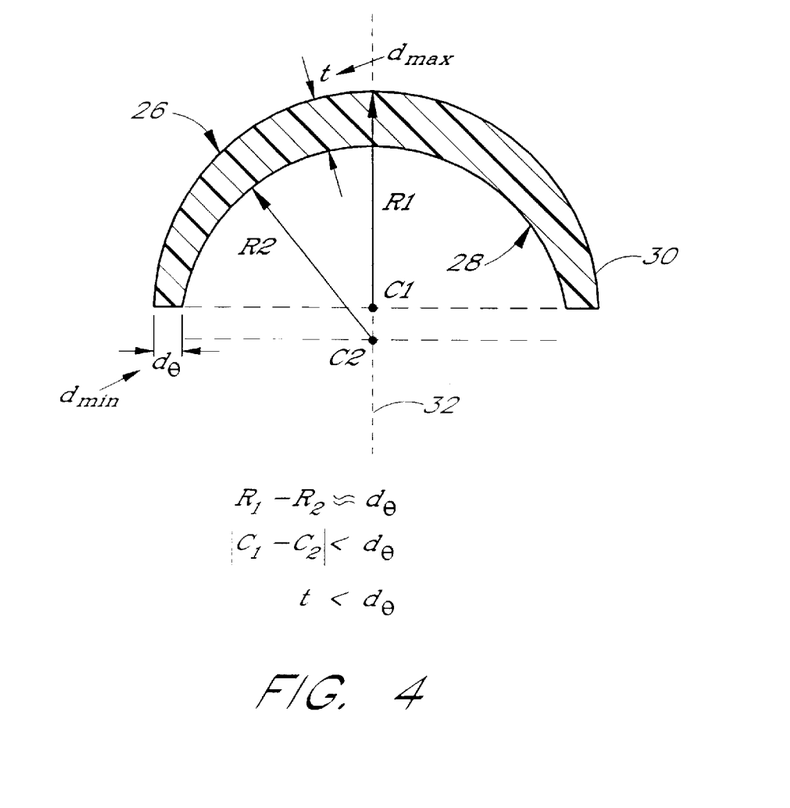
FIG. 4 is a cross-sectional view of the face shield of FIG. 2 taken along lines 4—4 illustrating the varying thickness of the shield of the present invention.

Those of ordinary skill will readily recognize that the lens portion 12 of the face shield 10 of the present invention has a thickness defined between outer and inner surfaces, and thus could be defined as having merely a single radius only when it has constant thickness. However, preferably, as shown in FIG. 4, which is a cross-sectional view of the face shield 10 of FIG. 2 taken along line 4—4, the lens portion 12 has a thickness or depth dimension $d_\theta$ along its entire arc length, which is defined between an outer facing (convex) surface 26 having a radius R1 and an inner facing (concave) surface 28 having a radius R2. In this embodiment, the radius R2 is less than the radius R1 and eccentric relative thereto. Specifically, the surfaces 26 and 28 have different radii of curvatures about centers that are shifted relative to each other. This eccentricity shifts one surface with respect to the other, to create a curved lens that has a thickness $d_\theta$ that varies monotonically away from a centerpoint, e.g., is tapered toward the edge, along the arc length of the face shield. Preferably, the inner concave surface 28 is not completely circular, but rather one surface at least is non-diametral to produce a minimum thickness $d_{min}$ at the edges 30 of the face shield. Furthermore, the diametral lines of the two surfaces are shifted such that the rear surface is moved back from a concentric position, thickening the central portion of the lens to produce a maximum thickness $d_{max}$ at or near centerline 32. As illustrated, the distance between the centerpoint C1 for radius R1 and the centerpoint C2 for radius R2 is preferably between 1 and 2 mm, but those of ordinary skill will recognize that this distance can vary depending upon the desired thickness of the shield at the center or at the edges of the lens in order to achieve a particular degree of bending, breaking, tensile or impact strength. According to one practice the absolute value of the difference in centerpoints is less than the lens thickness $d_\theta$.

As set forth above, plano (or constant-thickness) lenses introduce distortions or prismatic deviations into the field of view of the wearer by non-uniformly shifting light entering and exiting the lens. Lenses having truly concentric inner and outer radii, e.g., a plano lens bent into a circular shape, introduce prismatic deviations. This prism effect distorts, e.g., elongates or displaces, objects viewed by the wearer and this distortion is particularly exaggerated at the peripheral viewing regions of the lens. With reference to the present invention, the variable thickness $d_\theta$, and particularly the thinning effect of the lens at the edge regions 30, optically corrects the lens at the peripheral regions by reducing the occurrence of prismatic deviations and overall prism imbalance. Specifically, the lensing effect of the lens 12 in conjunction with the relatively thinner edge regions 30 introduce relatively low levels of distortion and serve to optically correct the view over substantially the entire lens area. Thus, the term "optically-correct" as used herein is intended to refer to the reduction in prismatic deviations created by the particular design and geometry of each embodiment of the face shield of the invention as described above in relation to FIGS. 1 and 2 and below in relation to FIGS. 5–7, and further is intended to include a face shield that exhibits a relatively low dioptric power and a relatively low prism power over a substantial portion of the wearer's field of view. Preferably, the shield includes only a few hundredths of a diopter of controlled dioptric power, and has a negative lensing effect which compensates for the prism aberrations. Furthermore, by shifting the front and rear curved surfaces, a structural thickening is achieved in a central region of low distortion, allowing a lower prism thickness to be safely employed peripherally.

According to the face shield embodiment of FIGS. 1 and 2, the thickness $d_{max}$ of the lens 12 at the centerline 32 is about 4 mm (0.157 inches) with a minimum thickness $d_{min}$ at the edges 30 ranging between about 2 mm (0.0787 inches) and about 2.7 mm (0.102 inches). According to one practice, the lens thickness $d_\theta$ varies smoothly with increasing angle from $d_{max}$ to $d_{min}$. The radius R1 preferably ranges between about 95 mm and about 110 mm, and most preferably between about 100 mm and about 105 mm, and the radius R2 ranges between about 96 mm and about 103 mm, and most preferably is about 100 mm. For the vertical curvature 18 of the lens, R1 preferably ranges between about 180 mm and 192 mm, and most preferably is about 187 mm, and R2 ranges between about 178 mm and about 186 mm, and most preferably is about 183 mm.

Furthermore, the illustrated face shield 10 has a height H1 that varies about the length of the shield in the horizontal direction. The vertical height H1 preferably varies between about 3.75 inches and about 4.75 inches along the curvature of the shield, and preferably is about 4.25 inches as measured at the centerline.

Referring again to FIGS. 1 and 2, the illustrated frame structure 14 includes ventilation apertures 40 formed in a peripheral band of the top portion 34 of the face shield 10. The ventilation apertures allow air to flow through the mask, either in an upward or downward direction, to provide for proper ventilation of the shield to resist or remove fogging. The size and number of the ventilation apertures is not important to the teachings of the present invention. A thickness web may provide added strength about the ventilation openings.

According to one practice, the face shield can be mounted to the head of the wearer or to various sport helmets by known retention mechanisms. For example, the face shield or protector 10 can be attached to a hockey helmet by way of conventional securing and mounting pins, hooks, straps, and like retention elements. One end of a securing strap preferably seats in the strap aperture 42 formed on either side of the frame member 14 to help secure the face shield to the helmet and about the face of the wearer.

When mounted on the helmet, the face shield 10 surrounds a substantial portion of the wearer's face, and particularly surrounds the upper portion of the face as well as the nose and portions of the cheeks. More particularly, the shield surrounds the face such that the inside surface of the lens is substantially non-oblique relative to the wearer's face and the wearer's field of view is substantially normal to the inside surface of the lens portion 12 of the shield 10 about most of the field of view. Additionally, the face shield 10 extends in the vertical direction a distance sufficient to include a substantial portion of the downward field of view without imposing upon the wearer the distortions and aberrations created by the edges of the shield. Specifically, the bottom portion of the face shield extends inwardly towards the wearer's face to allow the wearer to view the external environment through the lens portion at close distances, and through a contour which reduces obliqueness of incident rays.

The face shield 10 is composed of a transparent impact resistant material, such as polycarbonate, which has a refractive index of 1.586 at the helium d line. The face shield preferably meets selected strength and impact tests, including the Canadian impact testing standard CSA § 5.3.4. Those of ordinary skill will readily recognize that other suitable polymer materials can be used.

Figure 5:
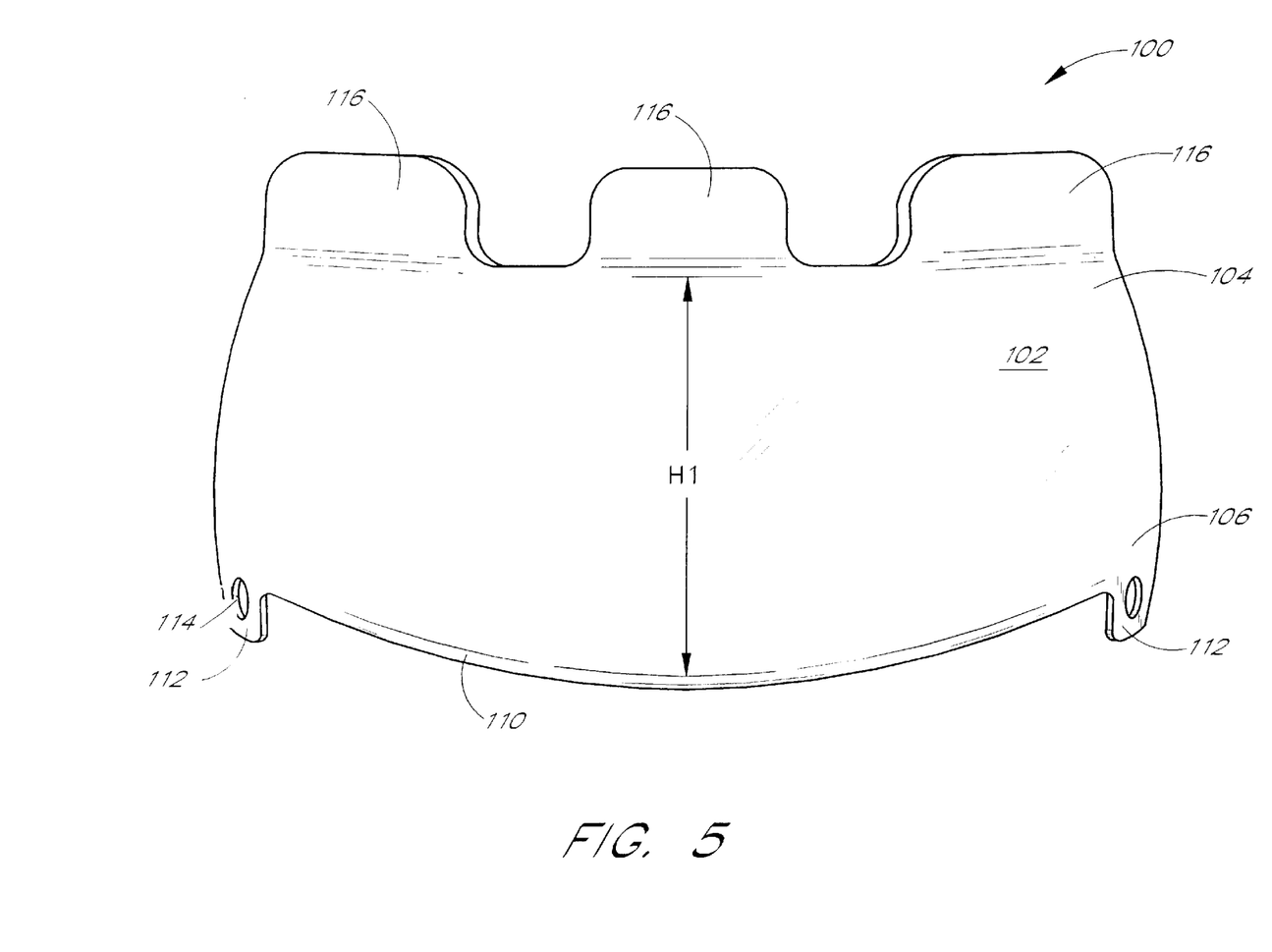
FIG. 5 is a front view of a second embodiment of the face shield of the present invention.
Figure 6:
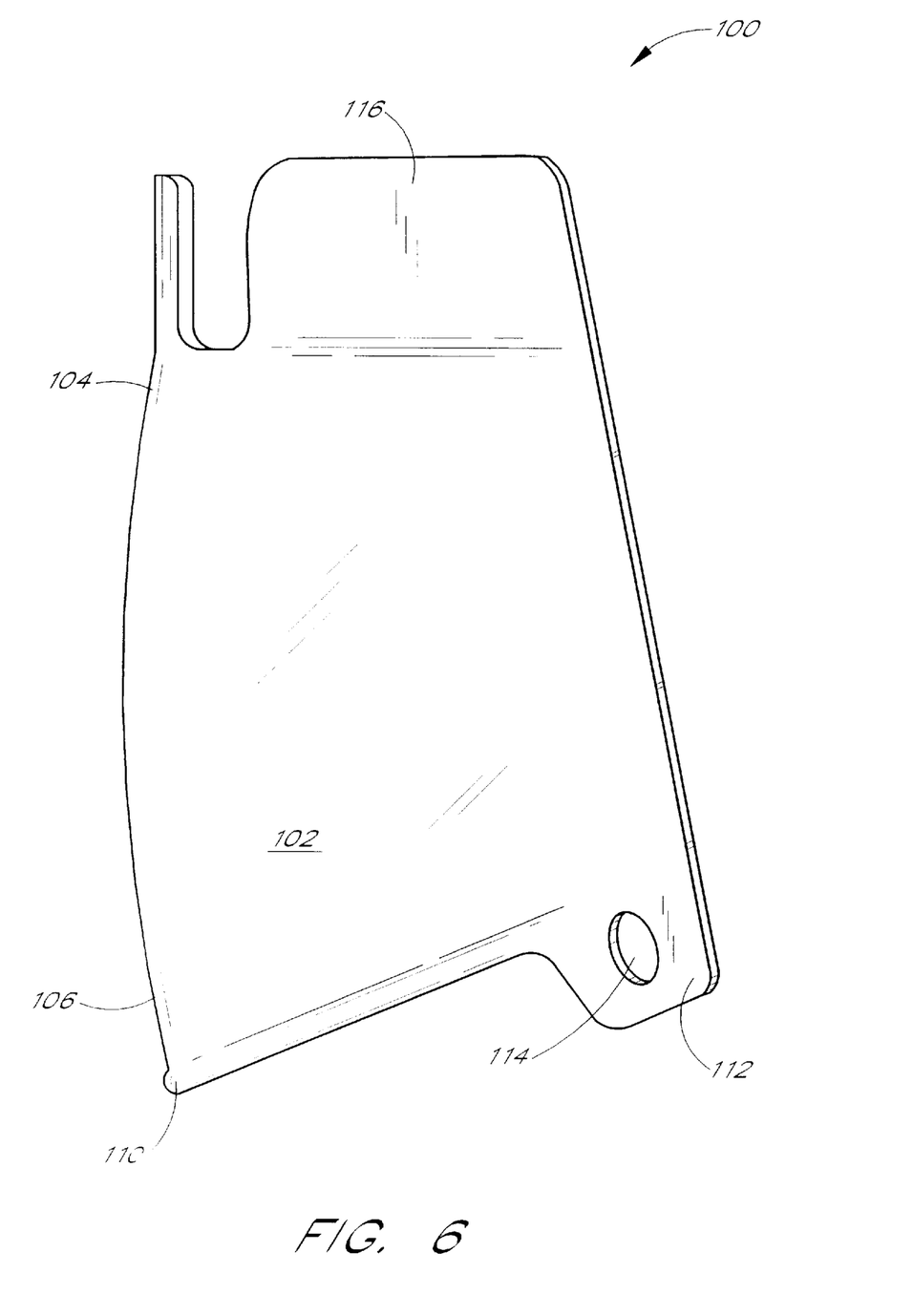
FIG. 6 is a side view of the face shield of FIG. 5.

FIGS. 5 and 6 illustrate a second embodiment of the face shield of the present invention. The illustrated face shield 100 has a unitary lens portion 102 that has a top portion 104 and a bottom portion 106. The lens portion 102 also includes a horizontal curvature and a vertical curvature that exhibit the same properties as those described above in relation to the face shield 10 of FIGS. 1 and 2. The horizontal curvature of the face shield approximates a semi-circle and thus provides a wrap-around face shield that covers and protects the face of the wearer while providing a window portion that extends about a substantial portion of the wearer's field of view. This wrap-around configuration of the lens 102 in both the horizontal and vertical directions provides a single view pane through which the wearer observes the external environment. This configuration allows the wearer to observe objects at any location through the lens portion 102 without requiring the wearer to change viewing environments, for example, view one object through the lens and another object at a different location outside of the view frame of the lens.

According to one practice, the radius of the horizontal curvature is preferably between about 3.25 inches and about 5.25 inches, and the radius of the vertical curvature is preferably in the range between about 6.35 inches and about 8.35 inches, and most preferably is about 7.4 inches. The foregoing radius dimensions represent the distance from an arbitrary center point to the arc defined by each curvature of the illustrated face shield 100.

The illustrated face shield 100 also has a thickness $d_\theta$ that is defined by outer and inner curved surfaces, as described above in relation to FIGS. 1–2 and 4. The illustrated face shield 100 preferably has an outer radius R1 that ranges between about 95 mm and about 110 mm, and most preferably is about 103 mm, and the radius R2 ranges between about 96 mm and about 103 mm, and most preferably is about 101 mm. For the vertical curvature of the lens 102, R1 preferably ranges between about 180 mm and 192 mm, and most preferably is about 187 mm, and R2 ranges between about 178 mm and about 186 mm, and most preferably is about 183 mm.

The illustrated face shield 100 further has a height H1 that varies about the length of the shield in the horizontal direction. The height H1 preferably varies between about 2.3 inches and about 4.3 inches, and preferably is about 3.3 inches at the center.

The optical and physical design properties described above in relation to shield 10 accrue to this embodiment to form an optically correct face shield that withstands the impact of foreign bodies, without cracking or breaking.

Referring again to FIGS. 5 and 6, the bottom portion 106 has formed thereon a molded beaded portion 110 that reinforces the bottom edge of the shield while eliminating sharp contours. The bottom portion 106 further includes a pair of downwardly projecting tabs 112 that include a mounting aperture 114 that extends therethrough. The top portion of the face shield 100 includes a set of upwardly projecting mounting protrusions 116.

Figure 8:
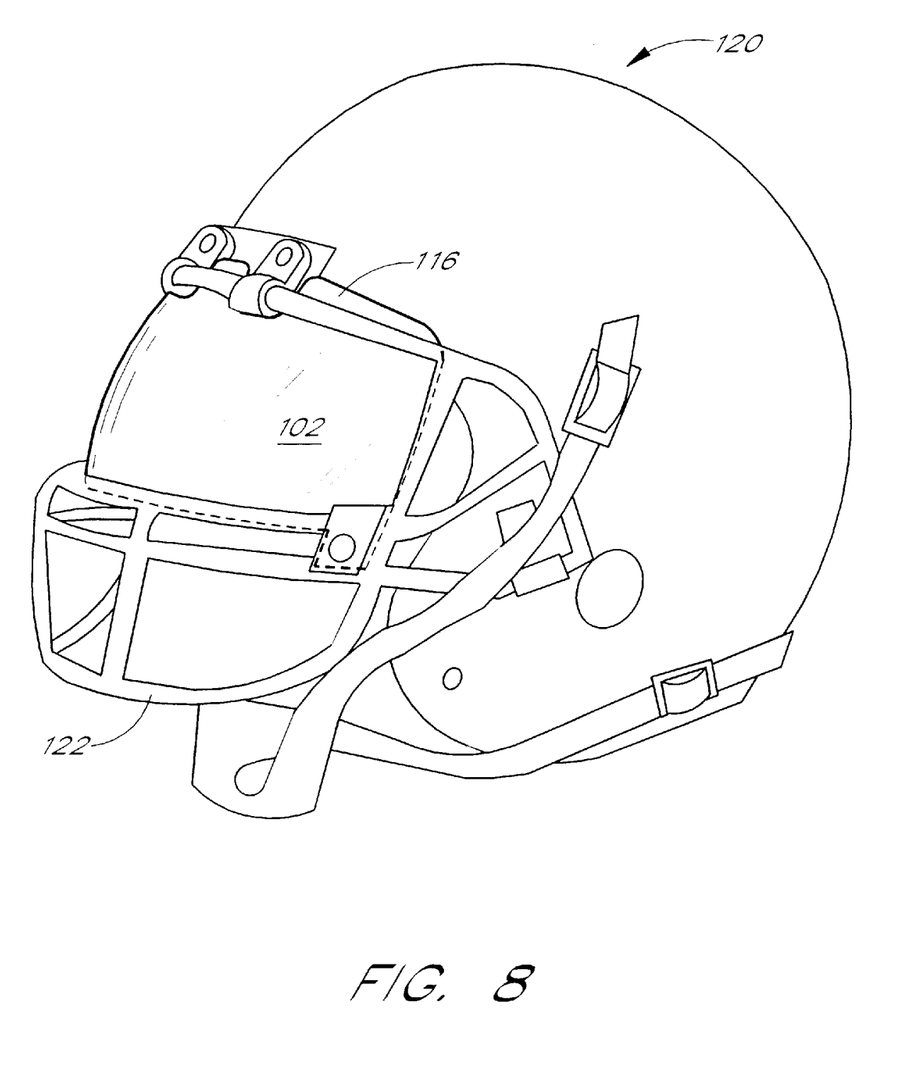
FIG. 8 is a perspective view of the face shield of FIG. 5 mounted to a conventional sporting helmet.

The face shield can be mounted to various sport helmets by known retention mechanisms. For example, the face shield or protector 100 can be attached to a football helmet 120 by way of conventional securing and mounting straps and like retention elements, as shown in FIG. 8. The shield 100 is secured to the face guard 122 of the helmet 120 by a set of T-bolts and nuts, and the top portion 104 of the shield 100 is wedged into the top of the face guard frame mounted directly to the helmet 120.

When mounted on the helmet, the face shield 100 surrounds a substantial portion of the wearer's face, and particularly surrounds the nose and portions of the cheeks. More particularly, the shield surrounds the face such that the inside surface is substantially non-oblique relative to the wearer's face and the wearer's field of view is substantially normal to the inside surface of the lens portion 12 of the shield 10. The face shield also extends about the face in the horizontal direction a distance sufficient to include at least a substantial portion of the field of view of the wearer.

Figure 7:
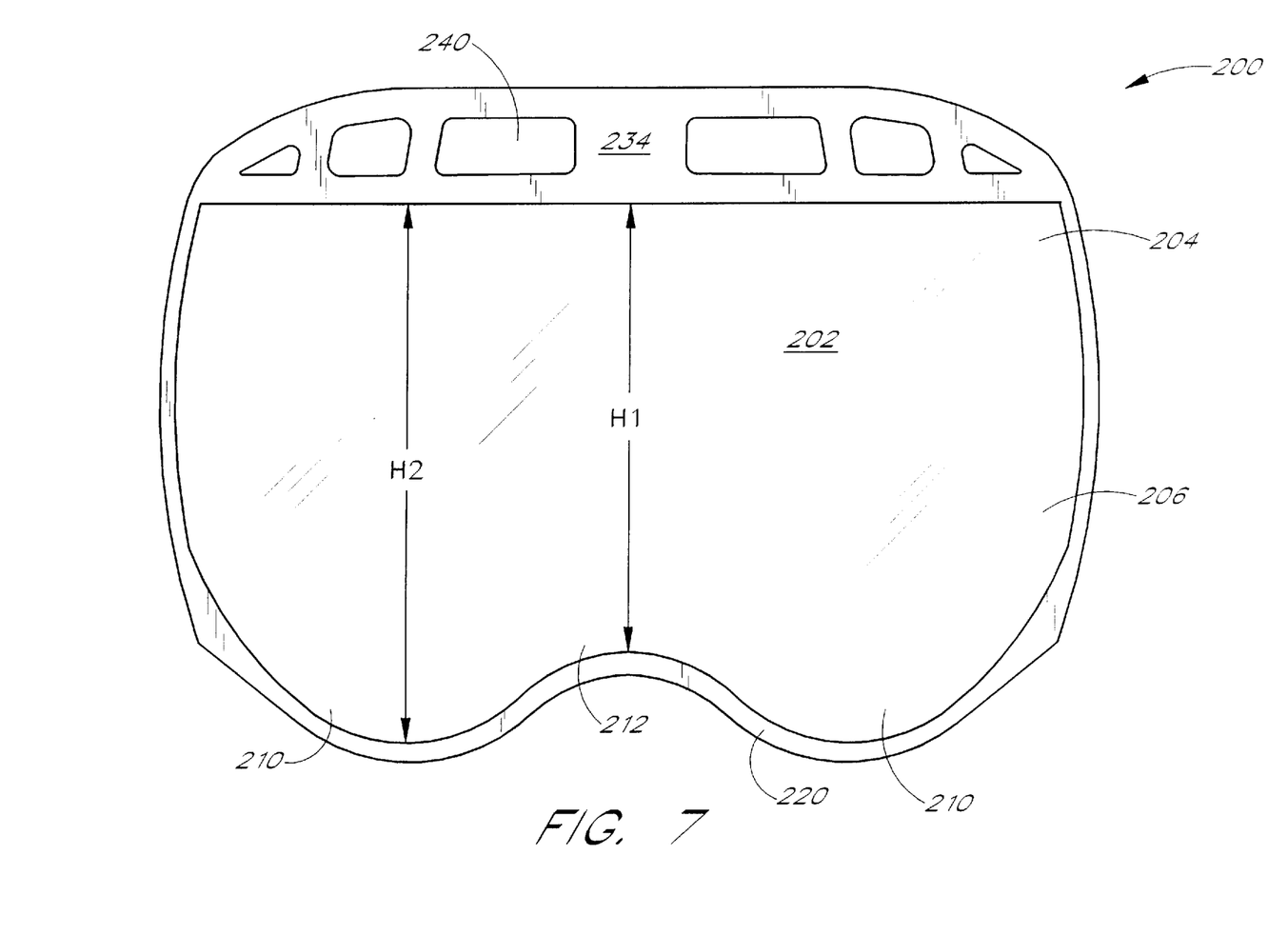
FIG. 7 is a front view of a third embodiment of the face shield of the present invention.

FIG. 7 illustrates a third embodiment of the face shield 200 of the present invention. The illustrated face shield 200 has a unitary lens portion 202 that has a top portion 204 and a bottom portion 206. The lens portion 202 also includes a horizontal curvature and a vertical curvature that exhibit the same properties as those described above in relation to the face shield 10 of FIGS. 1 and 2. The horizontal curvature of the face shield approximates a semi-circle and thus provides a wrap-around face shield that covers and protects the face of the wearer while providing a window portion that extends about a substantial portion of the wearer's field of view. This wrap-around configuration of the lens 202 in both the horizontal and vertical directions provides a single view pane through which the wearer observes the external environment. This configuration allows the wearer to observe objects at any location through the lens portion 202 without requiring the wearer to change viewing environments, for example, view one object through the lens and another object at a different location outside of the view frame of the lens.

According to one practice, the radius of the horizontal curvature of the face shield 202 is preferably between about 3 inches and about 5.5 inches, and most preferably is about 4 inches, and the radius of the vertical curvature is preferably in the range between about 6.5 inches and about 8.5 inches, and most preferably is about 7.4 inches. The foregoing radius dimensions represent the distance from an arbitrary center point to the arc defined by each curvature of the illustrated face shield 200.

The illustrated face shield 100 also has a thickness $d_\theta$ that is defined by outer and inner curved surfaces, as described above in relation to FIGS. 1–2 and 4. The illustrated face shield 200 preferably has an outer radius R1 that ranges between about 95 mm and about 110 mm, and most preferably is about 104 mm, and the radius R2 ranges between about 96 mm and about 105 mm, and most preferably is about 101 mm. For the vertical curvature of the lens 202, R1 preferably ranges between about 180 mm and 192 mm, and most preferably is about 188 mm, and R2 ranges between about 178 mm and about 186 mm, and most preferably is about 184 mm.

The lens portion further has a pair of downwardly projecting portions 210 that extend below an intermediate portion 212 to form secondary lens portions. These portions preferably have a radius between about 1.0 inch and 2.0 inches. The illustrated face shield 200 has a height H1 defined at the intermediate portion 212 that ranges between 3.5 inches and about 4.1 inches. The height H2 of the lens portion other than at the intermediate portion varies about the length of the shield in the horizontal direction. The height H2 preferably varies between about 4 inches and about 5 inches, and preferably is about 4.25 inches.

The optical and physical design properties described above in relation to shield 10 accrue to this embodiment to form an optically correct face shield that withstands the impact of foreign bodies, without cracking or breaking.

Referring again to FIG. 7, the bottom portion 206 has formed thereon a molded beaded portion 220 that reinforces the bottom edge of the shield while eliminating sharp contours. The beaded portion extends substantially about the entire periphery of the shield 200. The shield also includes ventilation apertures 240 formed in the top portion 234 of the bead. The ventilation apertures allow air to flow through the mask, either in an upward or downward direction, to provide for proper ventilation of the shield to resist fogging and aid clearing of the lens. The size and number of the ventilation apertures is not important to the teachings of the present invention.

Figure 9:
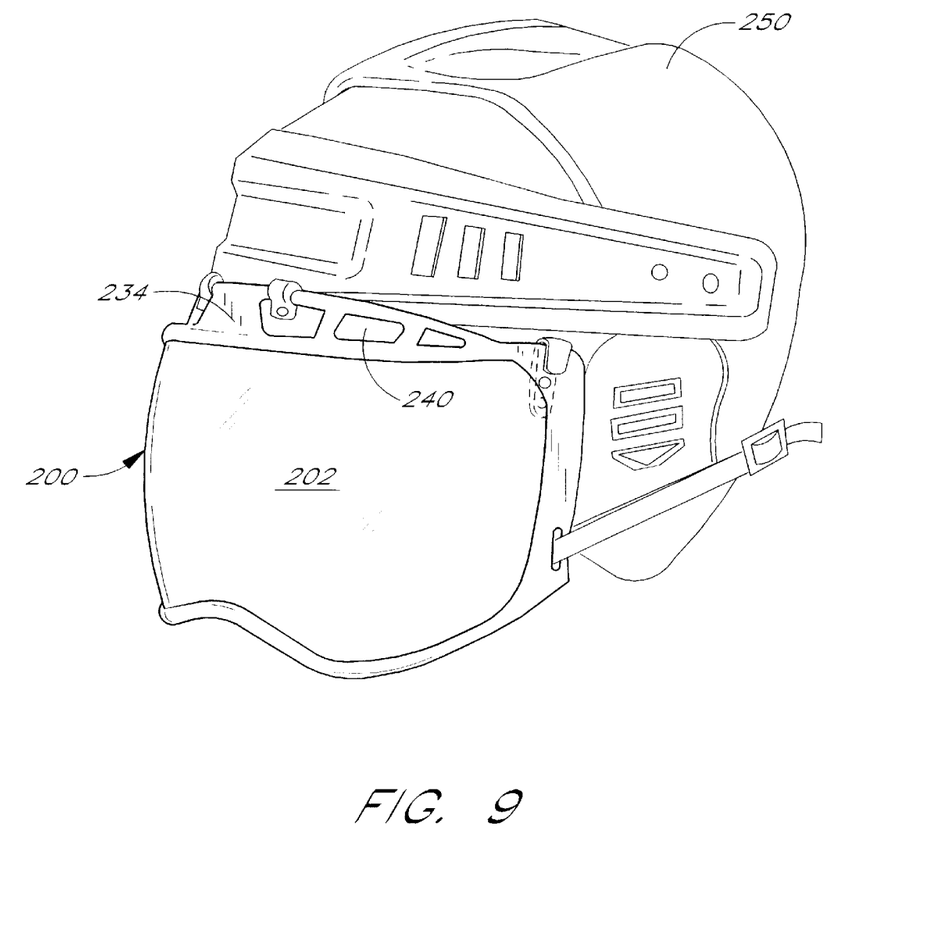
FIG. 9 is a perspective view of the face shield of FIG. 7 mounted to a conventional sporting helmet.

The face shield can be mounted to various sport helmets by known retention mechanisms. For example, the face shield 200 can be attached to a hockey helmet 250 by way of conventional pins, hooks, and securing and mounting straps, and like retention elements, as shown in FIG. 9.

When mounted on the helmet, the face shield 200 surrounds a substantial portion of the wearer's face, and particularly surrounds the nose and portions of the cheeks. More particularly, the shield surrounds the face such that the inside surface is substantially non-oblique relative to the wearer's face and the wearer's field of view is substantially normal to the inside surface of the lens portion 202 of the shield 200. The face shield also extends about the face in the horizontal direction a distance sufficient to include substantially the entire field of view of the wearer. The secondary lens portions 210 further project downwardly to ensure capture of a substantial portion of the downward field of view.

The face shields of the invention shown and described above can be made from known processes and techniques, such as injection molding.

The impact resistant face shield constructed according to the features of the present invention can be employed in a wide range of environments and for a wide range of uses. For example, the face shield shown and described above in relation to FIGS. 1–7 can be used by individuals for recreational and sporting activities in addition to football and hockey, such as skiing, roller-blading, soccer, basketball, baseball, lacrosse and other like activities. The face shield can also be employed in other industries by amateurs and/or professionals, such as by carpenters and medical personnel.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. An arcuately molded face shield for mounting to sporting helmets suitable for use in sporting events, said face shield comprising:

a unitary, optically-correct lens portion for shielding against mechanical impact a substantial portion of a sport participant's face having, in a first orientation, a first curvature extending in a horizontal direction and a second curvature extending in a vertical direction, said vertical curvature terminating in a top portion and a bottom portion, said bottom portion extending relatively inwardly towards the face of the participant relative to an intermediate portion of said lens disposed between the top and bottom portions when mounted to the sporting helmet.

2. The face shield of claim 1 further including frame means forming a frame integrally formed with and disposed about a portion of the periphery of said optically-correct lens portion in an as-molded condition.

3. The face shield of claim 1 wherein said optically-correct lens portion has a first distal end portion disposed on one end of the horizontal curvature of the lens, a second distal end portion disposed on an opposed end of the horizontal curvature, and a generally vertically extending intermediate portion disposed between the first and second distal portions, wherein at least portions of said first and second distal portions extend downwardly beyond said vertically-extending intermediate portion to form secondary lens portions.

4. The face shield of claim 3 wherein said vertically extending intermediate portion of said optically-correct lens portion has a first selected height $h_1$ measured between the top and bottom portions of the optically-correct lens portion that is in the range between about 3.5 inches and about 4.1 inches, and said secondary lens portions having a height $h_2$ defined between the top portion of the lens and the bottom portion of the lens that is in the range between about 4.0 inches and about 5.0 inches.

5. The face shield of claim 1 wherein said first curvature of said optically-correct lens portion has a radius in the range between about 3.0 inches and about 5.0 inches.

6. The face shield of claim 1 wherein said second curvature of said optically-correct lens portion has a radius in the range between about 6.5 inches and about 8.5 inches.

7. The face shield of claim 4 wherein each said secondary lens portion has a radius in the range between about 1.0 inches and 2.0 inches.

8. The face shield of claim 1 wherein the face shield is adapted for use in a hockey helmet.

9. The face shield of claim 1 wherein said horizontal portion of said optically-correct lens portion has a first distal portion and an opposed second distal portion and an intermediate portion disposed therebetween, and wherein said lens portion has a height $h_1$ measured between the top and bottom portions of the lens that varies between the first and second distal portions, said height $h_1$ being in the range between about 3.75 inches and about 4.75 inches.

10. The face shield of claim 1 wherein said first curvature has a radius in the range between about 6.35 inches and about 8.35 inches.

11. The face shield of claim 10 wherein said second curvature has a radius in the range between about 6.35 inches and about 8.35 inches.

12. The face shield of claim 11 wherein said horizontal curvature of said optically-correct lens portion has a first distal portion and a second distal portion and an intermediate portion disposed therebetween, and wherein said lens portion has a height $h_1$ measured between the top and bottom portions of the lens that varies between the first and second distal portions, said height $h_1$ being in the range between about 2.3 inches and about 4.3 inches.

13. A face protective shield for activity, comprising
   a shield body formed of strong clear polymeric material and having a peripheral region and a central region,
   the peripheral region including means for attaching to secure the shield body in front of a wearer's face, and
   the central region forming a viewing window sized to extend substantially entirely around in front of the wearer's face and having a thickness effective to survive impact without cracking, said thickness further introducing prism viewing aberrations, and said central region curves in horizontal and vertical planes over substantially the entire central region to introduce a degree of lensing and correct said viewing aberrations.

14. A face protective shield according to claim 13, wherein the face shield is formed of polycarbonate.

15. A face protective shield to claim 13, wherein said peripheral region includes a circumferential bead forming a frame about said central region.

* * * * *

UNITED STATES PATENT AND TRADEMARK OFFICE
CERTIFICATE OF CORRECTION

PATENT NO.    : 6,038,705
DATED         : March 21, 2000
INVENTOR(S)   : Edward C. Jarvis Page 1 of 1

It is certified that error appears in the above-identified patent and that said Letters Patent is hereby corrected as shown below:

<u>Title page,</u>
Item [22], after "Filed:  Oct. 6, 1998" should read:
-- Related U.S. Application Data

Continuation of U.S. Application 08/502,598, filed July 14, 1995, now U.S. Patent 5,815,848. --

<u>Column 1,</u>
Line 3, prior to "BACKGROUND OF THE INVENTION" should read:
-- REFERENCE TO RELATED APPLICATION This application is a continuation of U.S. Application 08/502,598, filed July 14, 1995, now U.S. Patent 5,815,848. The entire disclosure of U.S. Application 08/502,598 is considered as being part of this application and is incorporated by reference herein. --

Signed and Sealed this

Fourteenth Day of October, 2003

JAMES E. ROGAN
*Director of the United States Patent and Trademark Office*